(12) United States Patent
Poe et al.

(10) Patent No.: US 8,274,702 B2
(45) Date of Patent: Sep. 25, 2012

(54) SYSTEM AND METHOD FOR COLOR SPACE CONVERSION OF COLOR SPACE VALUES WHICH LIE OUTSIDE OF A TRADITIONAL COLOR SPACE BOUNDARY

(75) Inventors: Robert Poe, Leucadia, CA (US); Harold Boll, Arlington, MA (US)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 744 days.

(21) Appl. No.: 12/486,834

(22) Filed: Jun. 18, 2009

(65) Prior Publication Data

US 2010/0321710 A1    Dec. 23, 2010

(51) Int. Cl.
*H04N 1/60* (2006.01)
*H04N 1/46* (2006.01)
*G06K 15/00* (2006.01)
*G09G 5/00* (2006.01)
*G09G 5/02* (2006.01)

(52) U.S. Cl. .......... 358/1.9; 358/2.1; 358/501; 345/586; 345/590; 345/603; 345/604

(58) Field of Classification Search .......... 358/1.9, 358/505, 574, 448, 450, 452, 462, 426.04, 358/537, 534, 536, 540, 518, 515, 501, 3.1, 358/3.02, 2.1, 1.2; 345/427, 426, 428, 581, 345/419, 586, 587, 589, 590, 593, 597, 598, 345/599, 603, 604, 617, 620, 622, 643, 654, 345/672, 680; 382/167, 168, 256, 270, 276
See application file for complete search history.

(56) References Cited

U.S. PATENT DOCUMENTS

| 5,786,908 A * | 7/1998 | Liang ............... 358/518 |
| 7,864,366 B2 * | 1/2011 | Stevens ............... 358/1.9 |
| 2005/0259884 A1 * | 11/2005 | Murakami et al. .......... 382/252 |

OTHER PUBLICATIONS

Colantoni, Color Space Transformation 2004, Published by Philippe Colantoni and Al, pp. 1-28.*
Poynton, A Guided Tour of Color Space 1996, John Wiley&Sons, pp. 1-14.*

* cited by examiner

*Primary Examiner* — Benny Q Tieu
*Assistant Examiner* — Ngon Nguyen
(74) *Attorney, Agent, or Firm* — SoCal IP Law Group LLP; Steven C. Sereboff; Jonathan Pearce

(57) ABSTRACT

The subject application is directed to a system and method for color space conversion. Image data is received comprised of a plurality of pixels having a value encoded in a first multi-dimensional color space. Each of the pixels encoded in the first color space is converted to a corresponding pixel encoded in a second multidimensional color space, the conversion further including transforming each of the pixels based upon a function of the pixel values in the first color space having component values defining a fractional relationship having a numerator portion and a denominator portion, with each portion including at least one of the component values. A value of each denominator portion is converted relative to a threshold value and the pixels encoded in the first color space are converted to the second color space with an alternative quantity selectively substituted for each denominator portion in accordance with the comparison.

15 Claims, 11 Drawing Sheets

SYSTEM AND METHOD FOR COLOR SPACE CONVERSION OF COLOR SPACE VALUES WHICH LIE OUTSIDE OF A TRADITIONAL COLOR SPACE BOUNDARY

BACKGROUND OF THE INVENTION

The subject application is directed generally to conversions between color spaces. The application is particularly directed to conversion of color space values which lie outside of a traditional color space boundary.

Image data is typically stored as pixel data encoded in a multidimensional color space. Several of the device-independent color spaces in common use for color science and engineering, including digital color management systems, are based on recommendations by the Commission Internationale de l'Eclairage (CIE), a standards organization. The formulas used for the definition of CIE spaces were originally concerned with only those numerical qualities representing colors visible to the human visual system. However, modern hardware and software systems often need to operate on quantities outside the valid range of these formulae.

It will be appreciated by those skilled in the art that a singularity in a mathematical function or formula is a place in the domain where the function is undefined or ill behaved (for instance, unbounded or infinite), e.g. quantities outside the valid range of these formulae or functions. The most common kind of singularity occurs when the denominator of a fraction is zero, since division by zero is not defined.

The skilled artisan will further appreciate that singularities are quite common in formulae, and often do not present a problem, because most formulas are only expected to be used in restricted regions where the denominators are guaranteed to be non-zero. For example, the denominators are "bounded away from zero", i.e. they are above some minimum non-zero value.

In some instances, a formula that has been constructed or devised for use in such a restricted region will, at a later date, have to be used outside that region. Such use may result in an encounter with singularities. For example, in a digital system, if the hardware is ordered to divide something by zero, it will normally respond with a machine fault, e.g. possible crash of the system. Typically, though, the system software will detect the fault and take some appropriate action. The system may abort the application program and display an error message, or be able to recover and proceed in spite of the fault.

Even if the denominator is not zero, there may be a problem if the denominator is very small: The division may result in a quantity that is too big to be represented in the digital hardware, because of the limited bit-precision. This may produce an "overflow" condition—another kind of fault.

Applications programmers try to anticipate these problems by testing the denominator before the division and providing an alternative computation, so that machine faults are avoided. The most common way to accomplish this avoidance is by implementation of "clipping", i.e. if the denominator is less than a specified clipping value (typically very small), it is replaced by that value. The skilled artisan will thus appreciate that a singularity will not be encountered during the computation.

Unfortunately, while such clipping may prevent the aforementioned machine faults, the clipping may create other problems for the actual computation. The abrupt replacement of the original denominator by the clipping value may destroy the smoothness of the result. As will be appreciated by those skilled in the art, some algorithms do not work well unless the function behaves smoothly. Also, the modified function will not have a well-defined inverse in the region where the denominator has been clipped.

SUMMARY OF THE INVENTION

In accordance with one embodiment of the subject application, there is provided a system and method for color space conversion. Image data is received comprised of a plurality of pixels having a value encoded in a first multidimensional color space. Each of the plurality of pixels encoded in the first multidimensional color space is converted to a corresponding pixel encoded in a second multidimensional color space, the color space conversion further including transforming each of the plurality of pixels in accordance with a function of the pixel values in the first multidimensional color space having component values thereof defining a fractional relationship having a numerator portion and a denominator portion, each of which portions include at least one of the component values. A value of each denominator portion is converted relative to a threshold value and the plurality of pixels encoded in the first multidimensional color space are converted to the second multidimensional color space with selective substitution of each denominator portion with an alternative quantity in accordance with the comparison.

Still other advantages, aspects and features of the subject application will become readily apparent to those skilled in the art from the following description wherein there is shown and described a preferred embodiment of the subject application, simply by way of illustration of one of the best modes best suited to carry out the subject application. As it will be realized, the subject application is capable of other different embodiments and its several details are capable of modifications in various obvious aspects all without departing from the scope of the subject application. Accordingly, the drawings and descriptions will be regarded as illustrative in nature and not as restrictive.

BRIEF DESCRIPTION OF THE DRAWINGS

The subject application is described with reference to certain figures, including.

DETAILED DESCRIPTION OF THE PREFERRED EMBODIMENT

The subject application is directed to a system and method for color space conversion. In particular, the subject application is directed to a system and method for converting image data from a first multidimensional color space to a second multidimensional color space. More particularly, the subject application is directed to a system and method that is applicable to conversion of pixels in CIE color spaces having negative color values. It will become apparent to those skilled in the art that the system and method described herein are suitably adapted to a plurality of varying electronic fields employing conversions, including, for example and without limitation, communications, general computing, data processing, document/image processing, or the like. The preferred embodiment, as depicted in FIG. 1, illustrates a document/image processing field for example purposes only and is not a limitation of the subject application solely to such a field.

Figure 1:
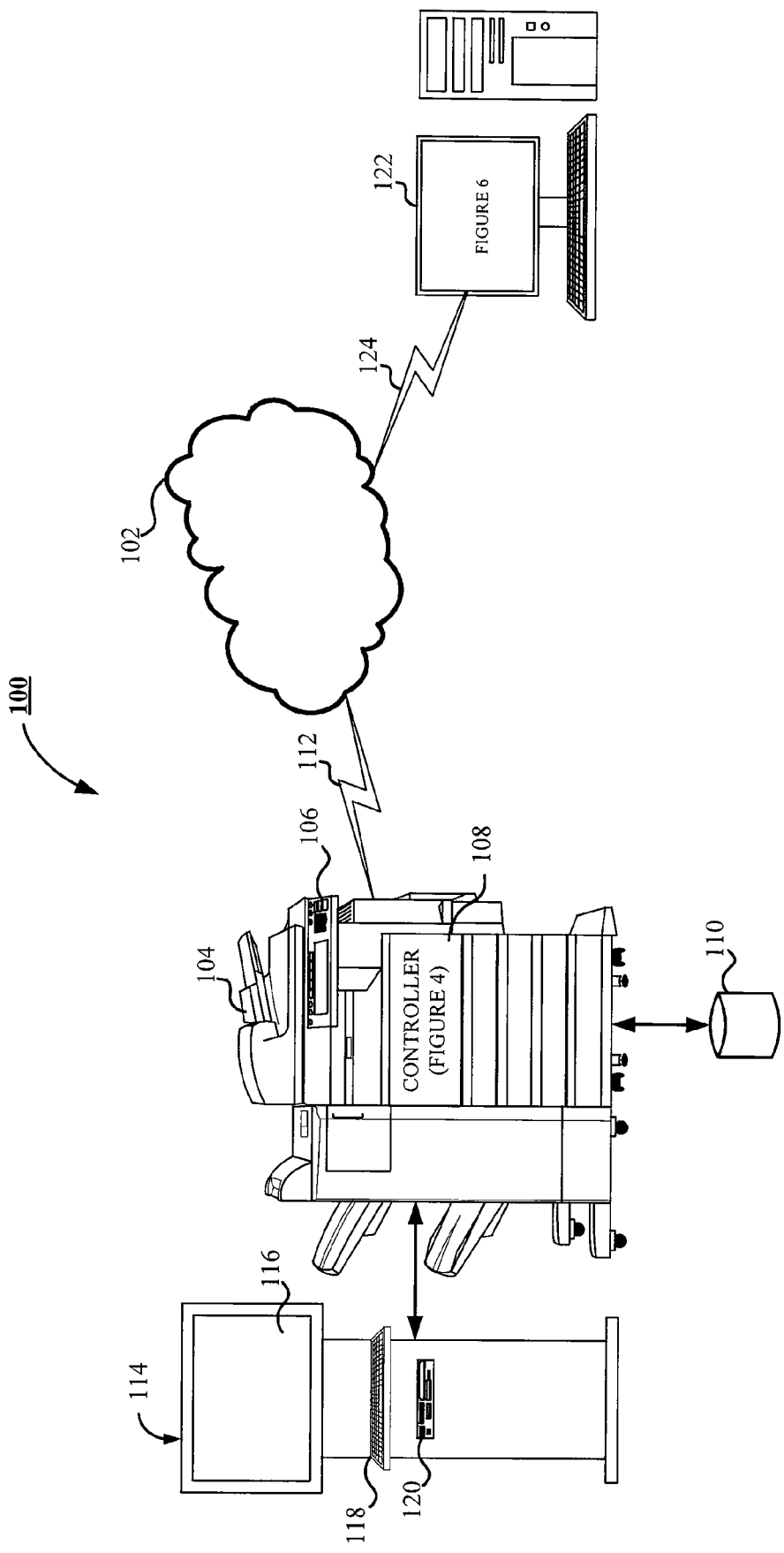
FIG. 1 is an overall diagram of a system for color space conversion according to one embodiment of the subject application.

Referring now to FIG. 1, there is shown an overall diagram of a system 100 for color space conversion in accordance with one embodiment of the subject application. As shown in FIG. 1, the system 100 is capable of implementation using a distributed computing environment, illustrated as a computer network 102. It will be appreciated by those skilled in the art that the computer network 102 is any distributed communications system known in the art capable of enabling the exchange of data between two or more electronic devices. The skilled artisan will further appreciate that the computer network 102 includes, for example and without limitation, a virtual local area network, a wide area network, a personal area network, a local area network, the Internet, an intranet, or the any suitable combination thereof. In accordance with the preferred embodiment of the subject application, the computer network 102 is comprised of physical layers and transport layers, as illustrated by the myriad of conventional data transport mechanisms, such as, for example and without limitation, Token-Ring, 802.11(x), Ethernet, or other wireless or wire-based data communication mechanisms. The skilled artisan will appreciate that while a computer network 102 is shown in FIG. 1, the subject application is equally capable of use in a stand-alone system, as will be known in the art.

The system 100 also includes a document processing device 104, which is depicted in FIG. 1 as a multifunction peripheral device, suitably adapted to perform a variety of document processing operations. It will be appreciated by those skilled in the art that such document processing operations include, for example and without limitation, facsimile, scanning, copying, printing, electronic mail, document management, document storage, or the like. Suitable commercially available document processing devices include, for example and without limitation, the Toshiba e-Studio Series Controller. In accordance with one aspect of the subject application, the document processing device 104 is suitably adapted to provide remote document processing services to external or network devices. Preferably, the document processing device 104 includes hardware, software, and any suitable combination thereof, configured to interact with an associated user, a networked device, or the like.

According to one embodiment of the subject application, the document processing device 104 is suitably equipped to receive a plurality of portable storage media, including, without limitation, Firewire drive, USB drive, SD, MMC, XD, Compact Flash, Memory Stick, and the like. In the preferred embodiment of the subject application, the document processing device 104 further includes an associated user interface 106, such as a touchscreen, LCD display, touch-panel, alpha-numeric keypad, or the like, via which an associated user is able to interact directly with the document processing device 104. In accordance with the preferred embodiment of the subject application, the user interface 106 is advantageously used to communicate information to the associated user and receive selections from the associated user. The skilled artisan will appreciate that the user interface 106 comprises various components, suitably adapted to present data to the associated user, as are known in the art. In accordance with one embodiment of the subject application, the user interface 106 comprises a display, suitably adapted to display one or more graphical elements, text data, images, or the like, to an associated user, receive input from the associated user, and communicate the same to a backend component, such as the controller 108, as explained in greater detail below. Preferably, the document processing device 104 is communicatively coupled to the computer network 102 via a communications link 112. As will be understood by those skilled in the art, suitable communications links include, for example and without limitation, WiMax, 802.11a, 802.11b, 802.11g, 802.11(x), Bluetooth, the public switched telephone network, a proprietary communications network, infrared, optical, or any other suitable wired or wireless data transmission communications known in the art. The functioning of the document processing device 104 will be better understood in conjunction with the block diagrams illustrated in FIGS. 2 and 3, explained in greater detail below.

In accordance with one embodiment of the subject application, the document processing device 104 incorporates a backend component, designated as the controller 108, suitably adapted to facilitate the operations of the document processing device 104, as will be understood by those skilled in the art. Preferably, the controller 108 is embodied as hardware, software, or any suitable combination thereof, configured to control the operations of the associated document processing device 104, facilitate the display of images via the user interface 106, direct the manipulation of electronic image data, and the like. For purposes of explanation, the controller 108 is used to refer to any myriad of components associated with the document processing device 104, including hardware, software, or combinations thereof, functioning to perform, cause to be performed, control, or otherwise direct the methodologies described hereinafter. It will be understood by those skilled in the art that the methodologies described with respect to the controller 108 is capable of being performed by any general purpose computing system, known in the art, and thus the controller 108 is representative of such general computing devices and is intended as such when used hereinafter. Furthermore, the use of the controller 108 hereinafter is for the example embodiment only, and other embodiments, which will be apparent to one skilled in the art, are capable of employing the system and method for type-ahead address lookup employing historically weighted address placement. The functioning of the controller 108 will better be understood in conjunction with the block diagrams illustrated in FIGS. 4 and 5, explained in greater detail below.

Communicatively coupled to the document processing device 104 is a data storage device 110. In accordance with the one embodiment of the subject application, the data storage device 110 is any mass storage device known in the art including, for example and without limitation, magnetic storage drives, a hard disk drive, optical storage devices, flash memory devices, or any suitable combination thereof. In one embodiment, the data storage device 110 is suitably adapted to store scanned image data, modified image data, redacted data, user information, cellular telephone data, pre-set payment data, document data, image data, electronic database data, or the like. It will be appreciated by those skilled in the art that while illustrated in FIG. 1 as being a separate component of the system 100, the data storage device 110 is capable of being implemented as an internal storage component of the document processing device 104, a component of the controller 108, or the like, such as, for example and without limitation, an internal hard disk drive, or the like. In accordance with one embodiment of the subject application, the data storage device 110 is capable of storing document processing instructions, usage data, user interface data, job control data, controller status data, component execution data, images, advertisements, user information, location information, output templates, mapping data, multimedia data files, fonts, and the like.

FIG. 1 also illustrates a kiosk 114 communicatively coupled to the document processing device 104, and in effect, the computer network 102. It will be appreciated by those skilled in the art that the kiosk 114 is capable of being implemented as a separate component of the document processing device 104, or as an integral component thereof. Use of the kiosk 114 in FIG. 1 is for example purposes only, and the skilled artisan will appreciate that the subject application is capable of implementation without the use of the kiosk 114. In accordance with one embodiment of the subject application, the kiosk 114 includes an associated display 116, and a user input device 118. As will be understood by those skilled in the art the kiosk 114 is capable of implementing a combination user input device/display, such as a touchscreen interface. According to one embodiment of the subject application, the kiosk 114 is suitably adapted to display prompts to an associated user, receive document processing instructions from the associated user, receive payment data, receive selection data from the associated user, and the like. Preferably, the kiosk 114 includes a magnetic card reader, conventional bar code reader, or the like, suitably adapted to receive and read payment data from a credit card, coupon, debit card, or the like.

The system 100 of FIG. 1 also includes a portable storage device reader 120, coupled to the kiosk 114, which is suitably adapted to receive and access a myriad of different portable storage devices. Examples of such portable storage devices include, for example and without limitation, flash-based memory such as SD, xD, Memory Stick, compact flash, CD-ROM, DVD-ROM, USB flash drives, or other magnetic or optical storage devices, as will be known in the art.

Depicted in FIG. 1 is a user device 122, illustrated as a computer workstation in data communication with the computer network 102 via a communications link 124. It will be appreciated by those skilled in the art that the user device 122 is shown in FIG. 1 as a computer workstation for illustration purposes only. As will be understood by those skilled in the art, the computer workstation 122 is representative of any personal computing device known in the art including, for example and without limitation, a laptop computer, a workstation computer, a personal data assistant, a web-enabled cellular telephone, a smart phone, a proprietary network device, or other web-enabled electronic device. The communications link 124 is any suitable channel of data communications known in the art including, but not limited to wireless communications, for example and without limitation, Bluetooth, WiMax, 802.11a, 802.11b, 802.11g, 802.11(x), a proprietary communications network, infrared, optical, the public switched telephone network, or any suitable wireless data transmission system, or wired communications known in the art. In accordance with one embodiment of the subject application, the computer workstation 122 is suitably configured to perform color space conversions according to the systems and methods set forth in the subject application. The functioning of the computer workstation 122 will better be understood in conjunction with the diagram illustrated in FIG. 6, explained in greater detail below.

Figure 2:
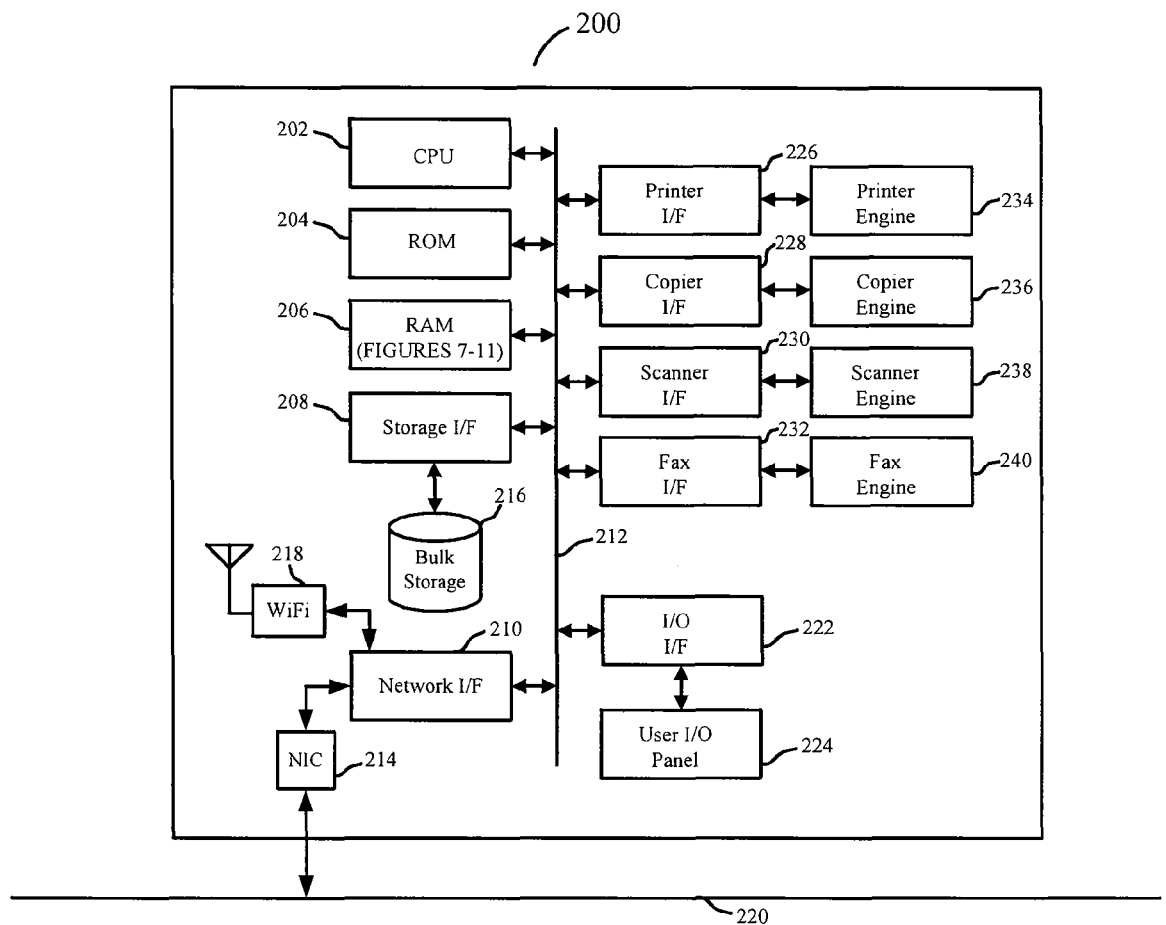
FIG. 2 is a block diagram illustrating device hardware for use in the system for color space conversion according to one embodiment of the subject application.

Turning now to FIG. 2, illustrated is a representative architecture of a suitable device 200, shown in FIG. 1 as the document processing device 104, on which operations of the subject system are completed. Included is a processor 202, suitably comprised of a central processor unit. However, it will be appreciated that the processor 202 may advantageously be composed of multiple processors working in concert with one another as will be appreciated by one of ordinary skill in the art. Also included is a non-volatile or read only memory 204 which is advantageously used for static or fixed data or instructions, such as BIOS functions, system functions, system configuration data, and other routines or data used for operation of the device 200.

Also included in the device 200 is random access memory 206, suitably formed of dynamic random access memory, static random access memory, or any other suitable, addressable memory system. Random access memory provides a storage area for data instructions associated with applications and data handling accomplished by the processor 202.

A storage interface 208 suitably provides a mechanism for volatile, bulk or long term storage of data associated with the device 200. The storage interface 208 suitably uses bulk storage, such as any suitable addressable or serial storage, such as a disk, optical, tape drive and the like as shown as 216, as well as any suitable storage medium as will be appreciated by one of ordinary skill in the art.

A network interface subsystem 210 suitably routes input and output from an associated network allowing the device 200 to communicate to other devices. The network interface subsystem 210 suitably interfaces with one or more connections with external devices to the device 200. By way of example, illustrated is at least one network interface card 214 for data communication with fixed or wired networks, such as Ethernet, token ring, and the like, and a wireless interface 218, suitably adapted for wireless communication via means such as WiFi, WiMax, wireless modem, cellular network, or any suitable wireless communication system. It is to be appreciated however, that the network interface subsystem suitably utilizes any physical or non-physical data transfer layer or protocol layer as will be appreciated by one of ordinary skill in the art. In the illustration, the network interface card 214 is interconnected for data interchange via a physical network 220, suitably comprised of a local area network, wide area network, or a combination thereof.

Data communication between the processor 202, read only memory 204, random access memory 206, storage interface 208 and the network subsystem 210 is suitably accomplished via a bus data transfer mechanism, such as illustrated by the bus 212.

Suitable executable instructions on the device 200 facilitate communication with a plurality of external devices, such as workstations, document processing devices, other servers, or the like. While, in operation, a typical device operates autonomously, it is to be appreciated that direct control by a local user is sometimes desirable, and is suitably accomplished via an optional input/output interface 222 to a user input/output panel 224 as will be appreciated by one of ordinary skill in the art.

Also in data communication with the bus 212 are interfaces to one or more document processing engines. In the illustrated embodiment, printer interface 226, copier interface 228, scanner interface 230, and facsimile interface 232 facilitate communication with printer engine 234, copier engine 236, scanner engine 238, and facsimile engine 240, respectively. It is to be appreciated that the device 200 suitably accomplishes one or more document processing functions. Systems accomplishing more than one document processing operation are commonly referred to as multifunction peripherals or multifunction devices.

Figure 3:
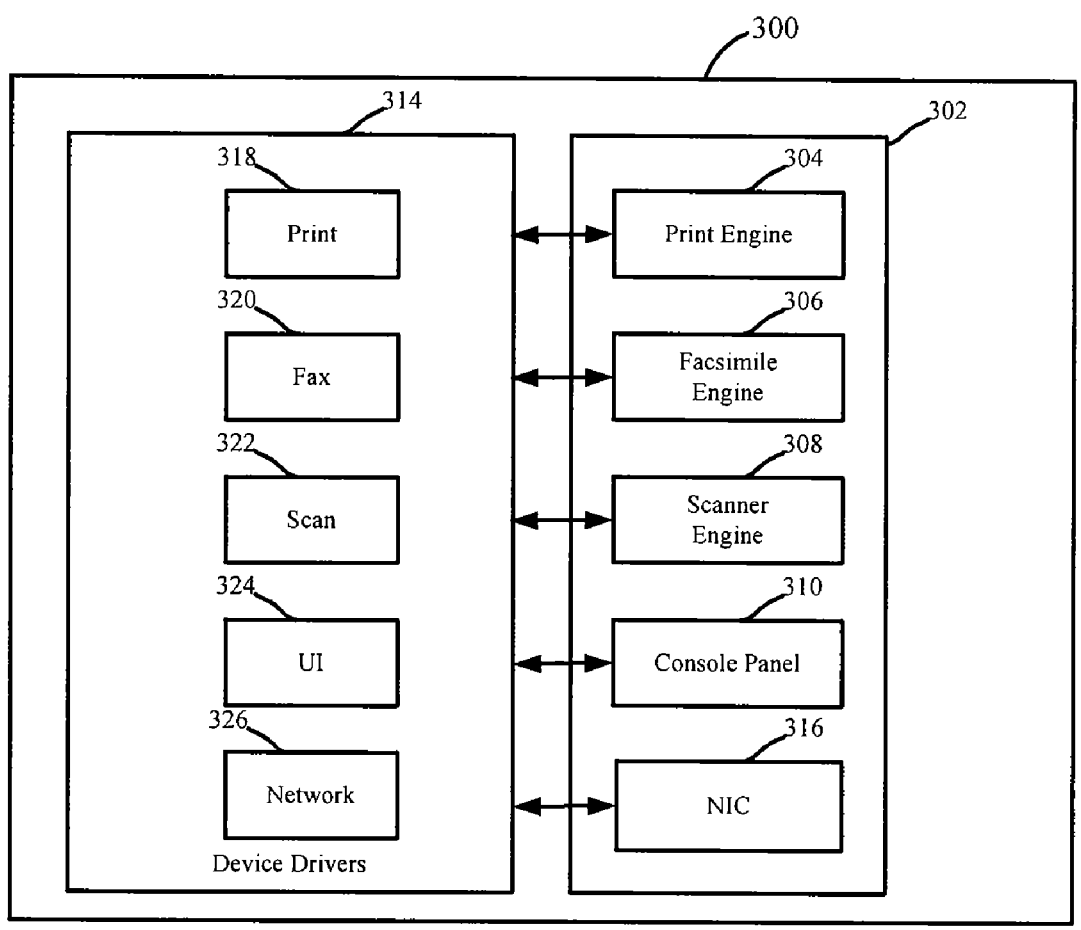
FIG. 3 is a functional diagram illustrating the device for use in the system for color space conversion according to one embodiment of the subject application.

Turning now to FIG. 3, illustrated is a suitable document processing device, depicted in FIG. 1 as the document processing device 104, for use in connection with the disclosed system. FIG. 3 illustrates suitable functionality of the hardware of FIG. 2 in connection with software and operating system functionality as will be appreciated by one of ordinary skill in the art. The document processing device 300 suitably includes an engine 302 which facilitates one or more document processing operations.

The document processing engine 302 suitably includes a print engine 304, facsimile engine 306, scanner engine 308 and console panel 310. The print engine 304 allows for output of physical documents representative of an electronic document communicated to the processing device 300. The facsimile engine 306 suitably communicates to or from external facsimile devices via a device, such as a fax modem.

The scanner engine 308 suitably functions to receive hard copy documents and in turn image data corresponding thereto. A suitable user interface, such as the console panel 310, suitably allows for input of instructions and display of information to an associated user. It will be appreciated that the scanner engine 308 is suitably used in connection with input of tangible documents into electronic form in bitmapped, vector, or page description language format, and is also suitably configured for optical character recognition. Tangible document scanning also suitably functions to facilitate facsimile output thereof.

In the illustration of FIG. 3, the document processing engine also comprises an interface 316 with a network via driver 326, suitably comprised of a network interface card. It will be appreciated that a network thoroughly accomplishes that interchange via any suitable physical and non-physical layer, such as wired, wireless, or optical data communication.

The document processing engine 302 is suitably in data communication with one or more device drivers 314, which device drivers allow for data interchange from the document processing engine 302 to one or more physical devices to accomplish the actual document processing operations. Such document processing operations include one or more of printing via driver 318, facsimile communication via driver 320, scanning via driver 322 and a user interface functions via driver 324. It will be appreciated that these various devices are integrated with one or more corresponding engines associated with the document processing engine 302. It is to be appreciated that any set or subset of document processing operations are contemplated herein. Document processors which include a plurality of available document processing options are referred to as multi-function peripherals.

Figure 4:
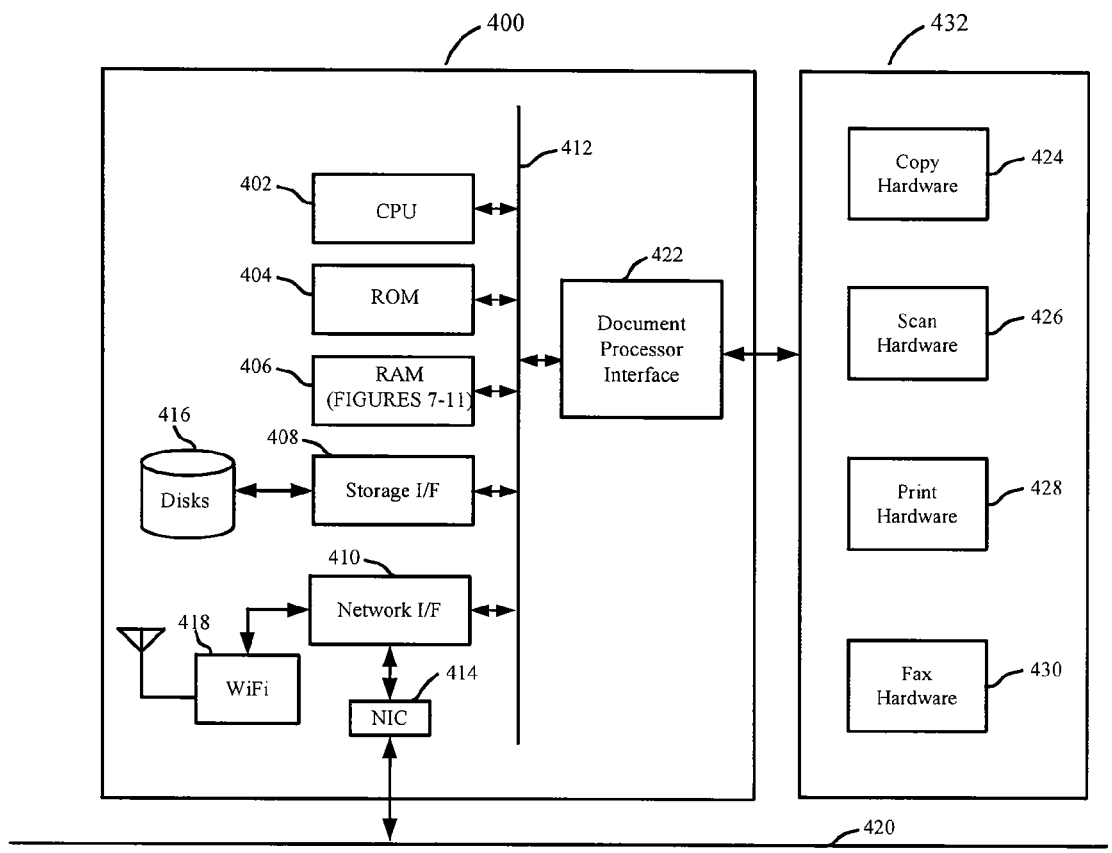
FIG. 4 is a block diagram illustrating controller hardware for use in the system for color space conversion according to one embodiment of the subject application.

Turning now to FIG. 4, illustrated is a representative architecture of a suitable backend component, i.e., the controller 400, shown in FIG. 1 as the controller 108, on which operations of the subject system 100 are completed. The skilled artisan will understand that the controller 400 is representative of any general computing device, known in the art, capable of facilitating the methodologies described herein. Included is a processor 402, suitably comprised of a central processor unit. However, it will be appreciated that processor 402 may advantageously be composed of multiple processors working in concert with one another as will be appreciated by one of ordinary skill in the art. Also included is a non-volatile or read only memory 404 which is advantageously used for static or fixed data or instructions, such as BIOS functions, system functions, system configuration data, and other routines or data used for operation of the controller 400.

Also included in the controller 400 is random access memory 406, suitably formed of dynamic random access memory, static random access memory, or any other suitable, addressable and writable memory system. Random access memory provides a storage area for data instructions associated with applications and data handling accomplished by processor 402.

A storage interface 408 suitably provides a mechanism for non-volatile, bulk or long term storage of data associated with the controller 400. The storage interface 408 suitably uses bulk storage, such as any suitable addressable or serial storage, such as a disk, optical, tape drive and the like as shown as 416, as well as any suitable storage medium as will be appreciated by one of ordinary skill in the art.

A network interface subsystem 410 suitably routes input and output from an associated network allowing the controller 400 to communicate to other devices. The network interface subsystem 410 suitably interfaces with one or more connections with external devices to the device 400. By way of example, illustrated is at least one network interface card 414 for data communication with fixed or wired networks, such as Ethernet, token ring, and the like, and a wireless interface 418, suitably adapted for wireless communication via means such as WiFi, WiMax, wireless modem, cellular network, or any suitable wireless communication system. It is to be appreciated however, that the network interface subsystem suitably utilizes any physical or non-physical data transfer layer or protocol layer as will be appreciated by one of ordinary skill in the art. In the illustration, the network interface 414 is interconnected for data interchange via a physical network 420, suitably comprised of a local area network, wide area network, or a combination thereof.

Data communication between the processor 402, read only memory 404, random access memory 406, storage interface 408 and the network interface subsystem 410 is suitably accomplished via a bus data transfer mechanism, such as illustrated by bus 412.

Also in data communication with the bus 412 is a document processor interface 422. The document processor interface 422 suitably provides connection with hardware 432 to perform one or more document processing operations. Such operations include copying accomplished via copy hardware 424, scanning accomplished via scan hardware 426, printing accomplished via print hardware 428, and facsimile communication accomplished via facsimile hardware 430. It is to be appreciated that the controller 400 suitably operates any or all of the aforementioned document processing operations. Systems accomplishing more than one document processing operation are commonly referred to as multifunction peripherals or multifunction devices.

Figure 5:
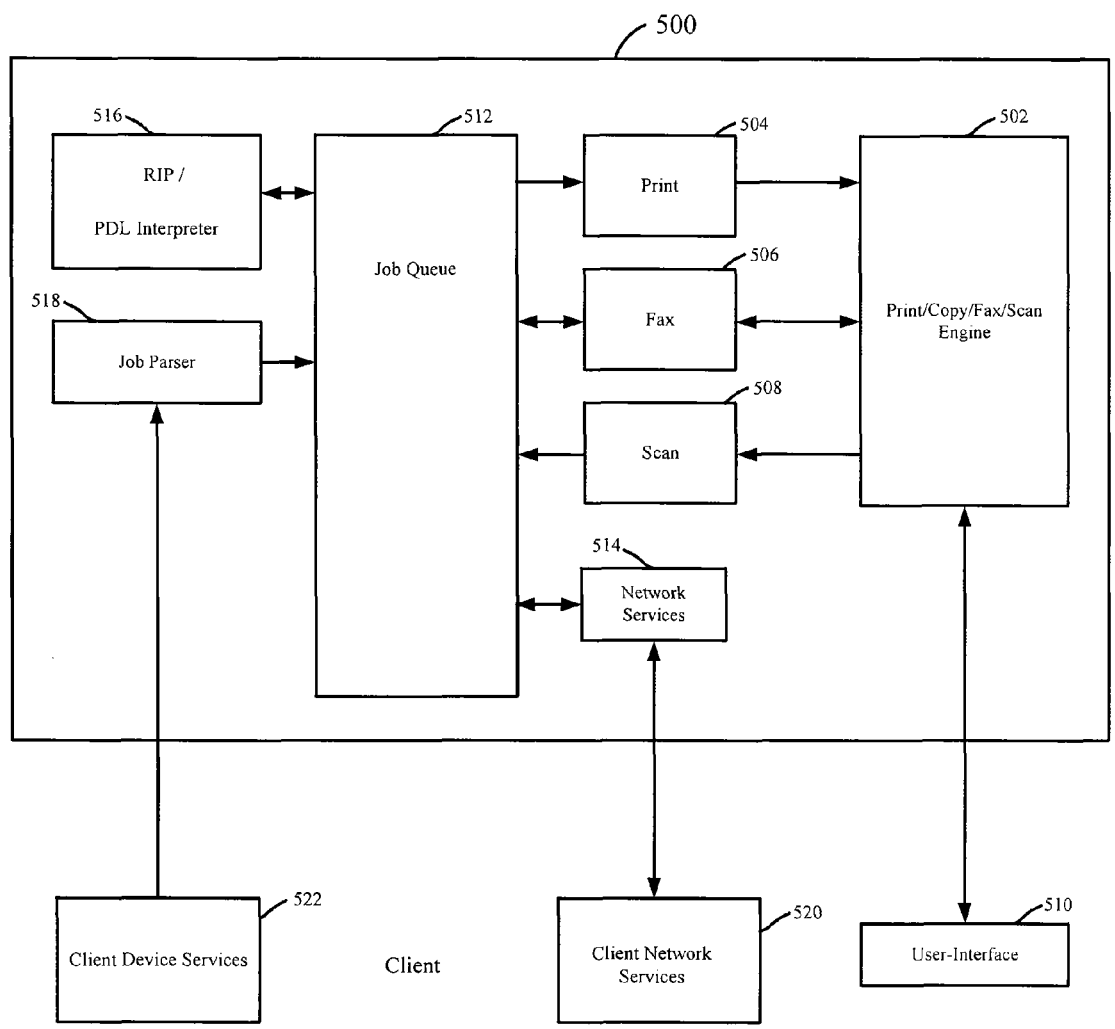
FIG. 5 is a functional diagram illustrating the controller for use in the system for color space conversion according to one embodiment of the subject application.

Functionality of the subject system 100 is accomplished on a suitable document processing device, such as the document processing device 104, which includes the controller 400 of FIG. 4, (shown in FIG. 1 as the controller 108) as an intelligent subsystem associated with a document processing device. In the illustration of FIG. 5, controller function 500 in the preferred embodiment includes a document processing engine 502. Suitable controller functionality is that incorporated into the Toshiba e-Studio system in the preferred embodiment. FIG. 5 illustrates suitable functionality of the hardware of FIG. 4 in connection with software and operating system functionality as will be appreciated by one of ordinary skill in the art.

In the preferred embodiment, the engine 502 allows for printing operations, copy operations, facsimile operations and scanning operations. This functionality is frequently associated with multi-function peripherals, which have become a document processing peripheral of choice in the industry. It will be appreciated, however, that the subject controller does not have to have all such capabilities. Controllers are also advantageously employed in dedicated or more limited purposes document processing devices that perform one or more of the document processing operations listed above.

The engine 502 is suitably interfaced to a user interface panel 510, which panel allows for a user or administrator to access functionality controlled by the engine 502. Access is suitably enabled via an interface local to the controller, or remotely via a remote thin or thick client.

The engine 502 is in data communication with the print function 504, facsimile function 506, and scan function 508. These functions facilitate the actual operation of printing, facsimile transmission and reception, and document scanning for use in securing document images for copying or generating electronic versions.

A job queue 512 is suitably in data communication with the print function 504, facsimile function 506, and scan function 508. It will be appreciated that various image forms, such as bit map, page description language or vector format, and the like, are suitably relayed from the scan function 308 for subsequent handling via the job queue 512.

The job queue 512 is also in data communication with network services 514. In a preferred embodiment, job control, status data, or electronic document data is exchanged between the job queue 512 and the network services 514. Thus, suitable interface is provided for network based access to the controller function 500 via client side network services 520, which is any suitable thin or thick client. In the preferred embodiment, the web services access is suitably accomplished via a hypertext transfer protocol, file transfer protocol, uniform data diagram protocol, or any other suitable exchange mechanism. The network services 514 also advantageously supplies data interchange with client side services 520 for communication via FTP, electronic mail, TELNET, or the like. Thus, the controller function 500 facilitates output or receipt of electronic document and user information via various network access mechanisms.

The job queue 512 is also advantageously placed in data communication with an image processor 516. The image processor 516 is suitably a raster image process, page description language interpreter or any suitable mechanism for interchange of an electronic document to a format better suited for interchange with device functions such as print 504, facsimile 506 or scan 508.

Finally, the job queue 512 is in data communication with a parser 518, which parser suitably functions to receive print job language files from an external device, such as client device services 522. The client device services 522 suitably include printing, facsimile transmission, or other suitable input of an electronic document for which handling by the controller function 500 is advantageous. The parser 518 functions to interpret a received electronic document file and relay it to the job queue 512 for handling in connection with the afore-described functionality and components.

Figure 6:
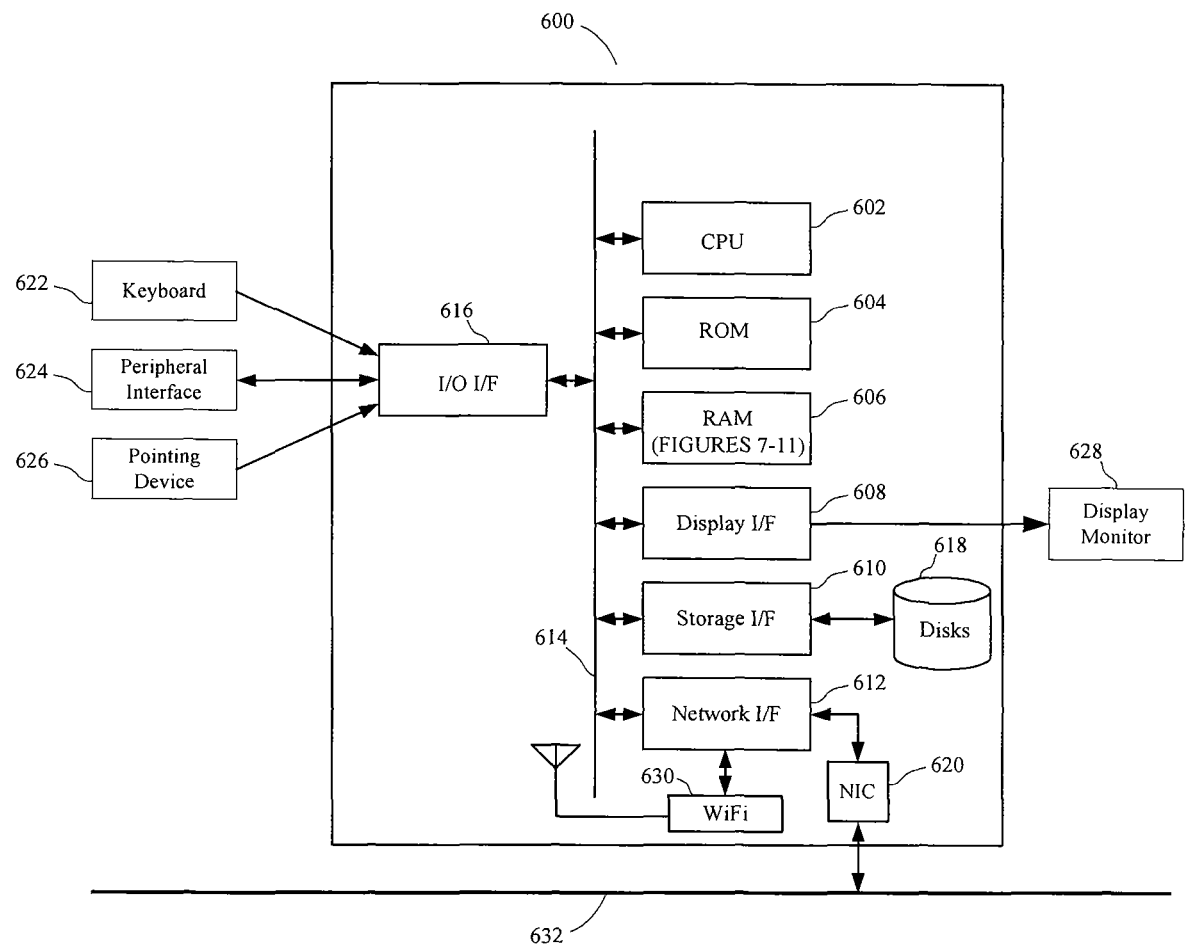
FIG. 6 is a functional diagram illustrating a workstation for use in the system for color space conversion according to one embodiment of the subject application.

Turning now to FIG. 6, illustrated is a hardware diagram of a suitable workstation 600, shown as the computer workstation 122, for use in connection with the subject system. A suitable workstation includes a processor unit 602 which is advantageously placed in data communication with read only memory 604, suitably non-volatile read only memory, volatile read only memory or a combination thereof, random access memory 606, display interface 608, storage interface 610, and network interface 612. In a preferred embodiment, interface to the foregoing modules is suitably accomplished via a bus 614.

The read only memory 604 suitably includes firmware, such as static data or fixed instructions, such as BIOS, system functions, configuration data, and other routines used for operation of the workstation 600 via CPU 602.

The random access memory 606 provides a storage area for data and instructions associated with applications and data handling accomplished by the processor 602.

The display interface 608 receives data or instructions from other components on the bus 614, which data is specific to generating a display to facilitate a user interface. The display interface 608 suitably provides output to a display terminal 628, suitably a video display device such as a monitor, LCD, plasma, or any other suitable visual output device as will be appreciated by one of ordinary skill in the art.

The storage interface 610 suitably provides a mechanism for non-volatile, bulk or long term storage of data or instructions in the workstation 600. The storage interface 610 suitably uses a storage mechanism, such as storage 618, suitably comprised of a disk, tape, CD, DVD, or other relatively higher capacity addressable or serial storage medium.

The network interface 612 suitably communicates to at least one other network interface, shown as network interface 620, such as a network interface card, and wireless network interface 630, such as a WiFi wireless network card. It will be appreciated that by one of ordinary skill in the art that a suitable network interface is comprised of both physical and protocol layers and is suitably any wired system, such as Ethernet, token ring, or any other wide area or local area network communication system, or wireless system, such as WiFi, WiMax, or any other suitable wireless network system, as will be appreciated by one of ordinary skill in the art. In the illustration, the network interface 620 is interconnected for data interchange via a physical network 632, suitably comprised of a local area network, wide area network, or a combination thereof.

An input/output interface 616 in data communication with the bus 614 is suitably connected with an input device 622, such as a keyboard or the like. The input/output interface 616 also suitably provides data output to a peripheral interface 624, such as a USB, universal serial bus output, SCSI, Firewire (IEEE 1394) output, or any other interface as may be appropriate for a selected application. Finally, the input/output interface 616 is suitably in data communication with a pointing device interface 626 for connection with devices, such as a mouse, light pen, touch screen, or the like.

Figure 7:
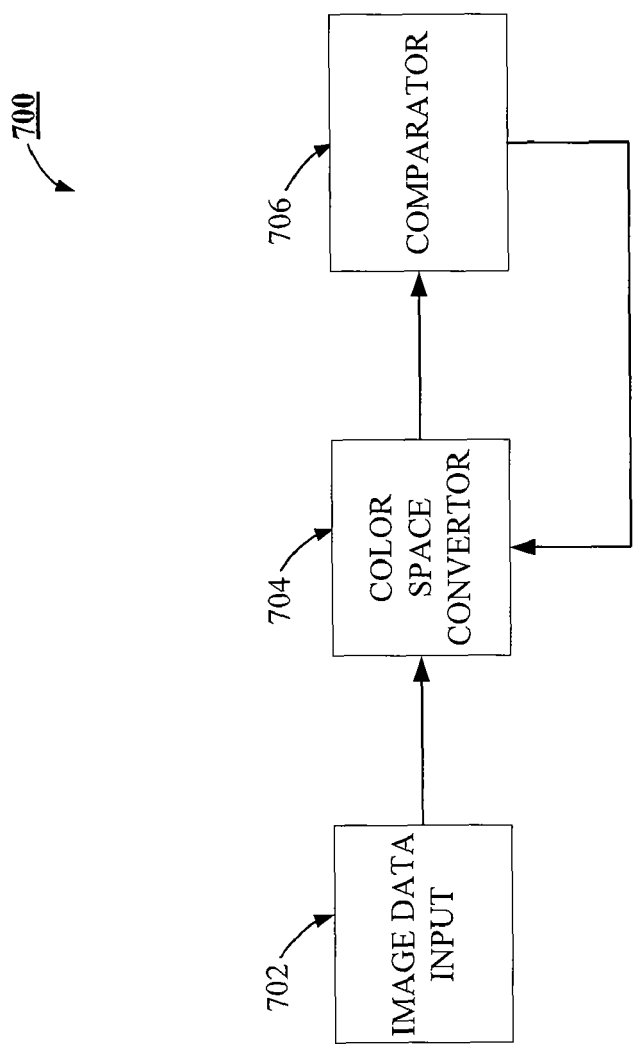
FIG. 7 is a block diagram illustrating the system for color space conversion according to one embodiment of the subject application.

Turning now to FIG. 7, illustrated is a block diagram of a system 700 for color space conversion in accordance with one embodiment of the subject application. The system 700 includes an image data input 702 operable to receive image data that consists of pixels having a value encoded in a first multidimensional color space. The system 700 also includes a color space convertor 704 configured to transform each pixel encoded in the first multidimensional color space into a corresponding pixel encoded in a second multidimensional color space. Preferably, the color space convertor 704 transforms each of the pixels based upon a function of the pixel values in the first multidimensional color space having component values defining a fractional relationship having a numerator portion and a denominator portion, with each portion including at least one of the component values. The system 700 further includes a comparator 706 configured to compare a value of each denominator portion relative to a threshold value. Based upon an output from the comparator 706 corresponding to selective substitution of each denominator portion with an alternative quantity, the color space convertor 704 transforms each of the pixels encoded in the first color space to the second color space.

Figure 8:
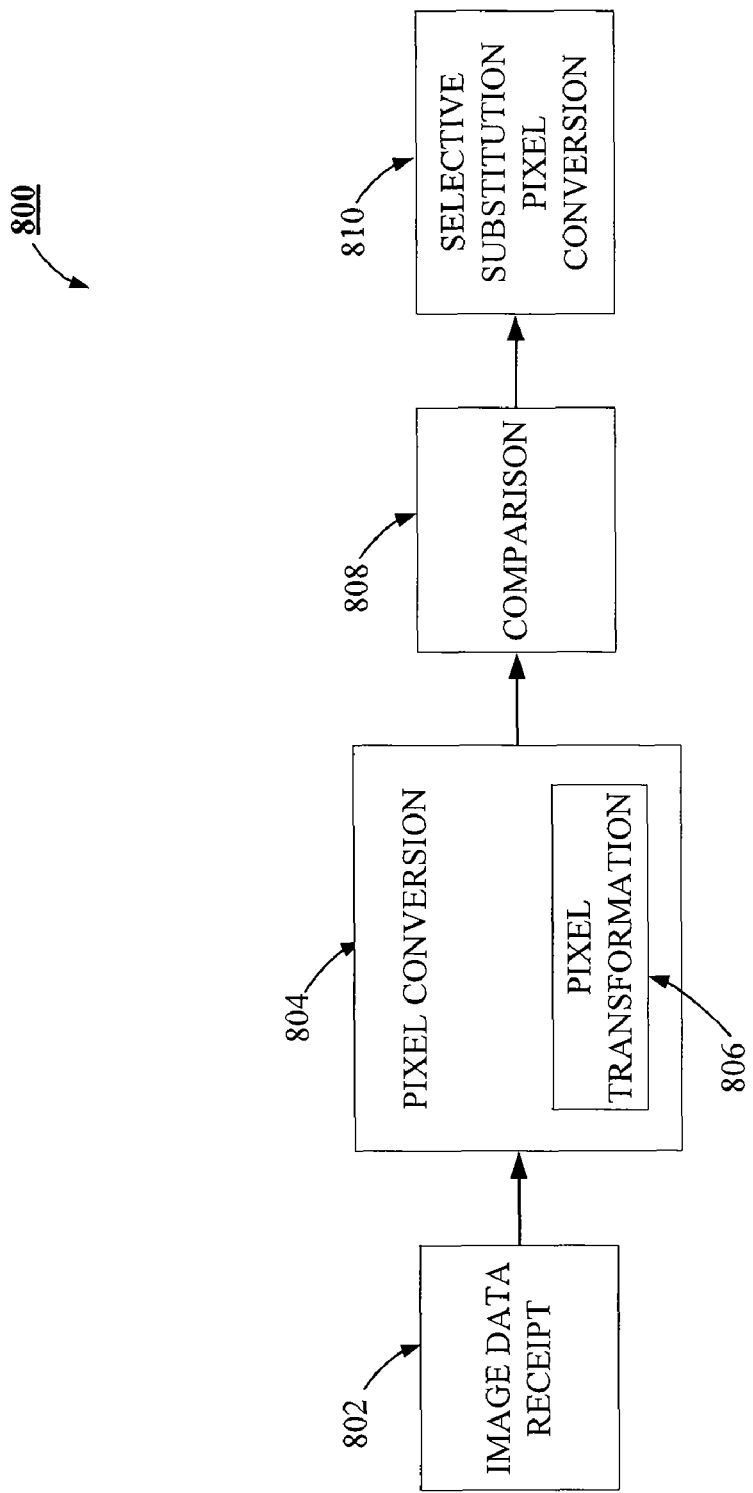
FIG. 8 is a functional diagram illustrating the system for color space conversion according to one embodiment of the subject application.

Referring now to FIG. 8, there is shown a functional diagram illustrating the system 800 for color space conversion in accordance with one embodiment of the subject application. Image data receipt 802 first occurs corresponding to the receipt of image data that comprises pixels having a value encoded in a first multidimensional color space. Pixel conversion 804 then occurs corresponding to the conversion of each of the pixels of the image data from the first multidimensional color space to a corresponding pixel encoded in a second multidimensional color space. Preferably, the conversion 804 further includes pixel transformation 806 corresponding to the transformation of each of the pixels in accordance with a function of the pixel values in the first multidimensional color space having component values defining a fractional relationship having a numerator portion and a denominator portion. The skilled artisan will appreciate that numerator and denominator portions include at least one of the component values.

A comparison 808 is then performed of a value of each denominator portion relative to a threshold value. Selective substitution pixel conversion 810 is then performed in accordance with an output of the comparison 808 corresponding to the selective substitution of each denominator portion with an alternative quantity resulting in conversion of the pixels encoded in the first multidimensional color space to the second multidimensional color space.

Figure 9:
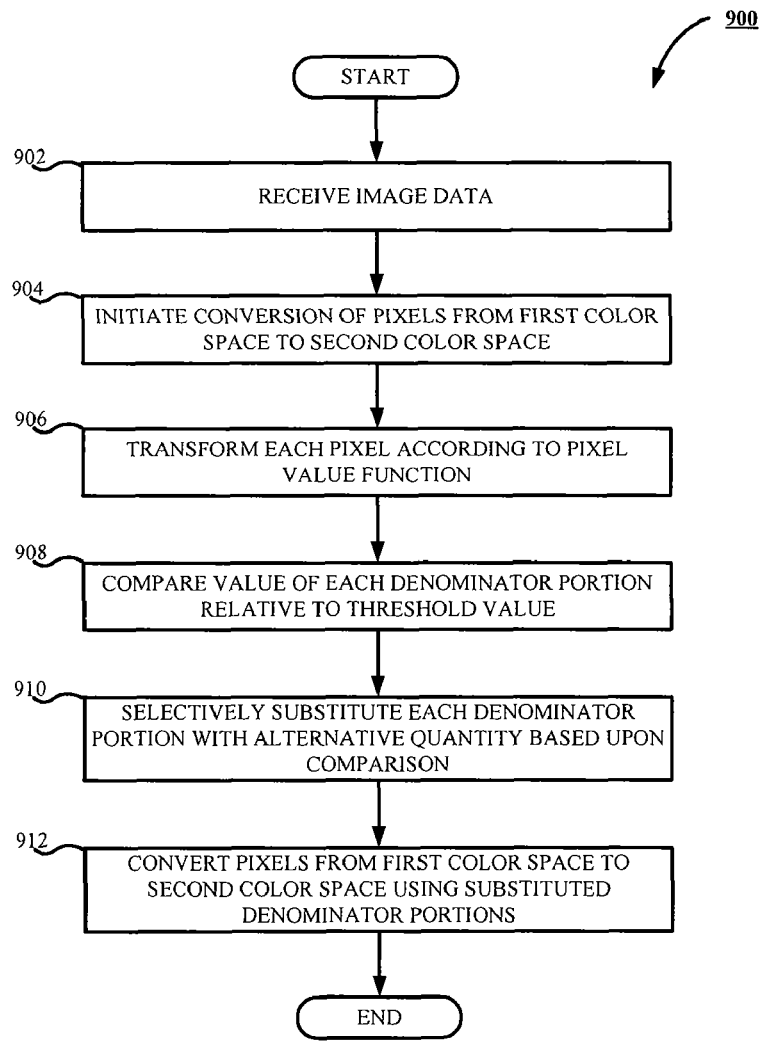
FIG. 9 is a flowchart illustrating a method for color space conversion according to one embodiment of the subject application.

The skilled artisan will appreciate that the subject system 100 and components described above with respect to FIG. 1, FIG. 2, FIG. 3, FIG. 4, FIG. 5, FIG. 6, FIG. 7, and FIG. 8 will be better understood in conjunction with the methodologies described hereinafter with respect to FIG. 9 and FIG. 10. Turning now to FIG. 9, there is shown a flowchart 900 illustrating a method of color space conversion in accordance with one embodiment of the subject application. Beginning at step 902, image data is received comprising a plurality of pixels having a value encoded in a first multidimensional color space. At step 904, the conversion of each pixel encoded in the first multidimensional color space to a second multidimensional color space is initiated.

During the conversion initiated at step 904, flow proceeds to step 906, whereupon each pixel is transformed according to a function of the pixel values in the first multidimensional color space having component values defining a fractional relationship having a numerator portion and a denominator portion. Preferably, each numerator and denominator portion includes at least one of the component values. At step 908, a value of each denominator portion is compared relative to a threshold value. Each denominator portion is then selectively substituted with an alternative quantity at step 910 based upon the output of the comparison at step 908. Thereafter, flow proceeds to step 912, whereupon the conversion of pixels from the first multidimensional color space to the second multidimensional color space is completed using the denominator portions substituted at step 910.

Figure 10:
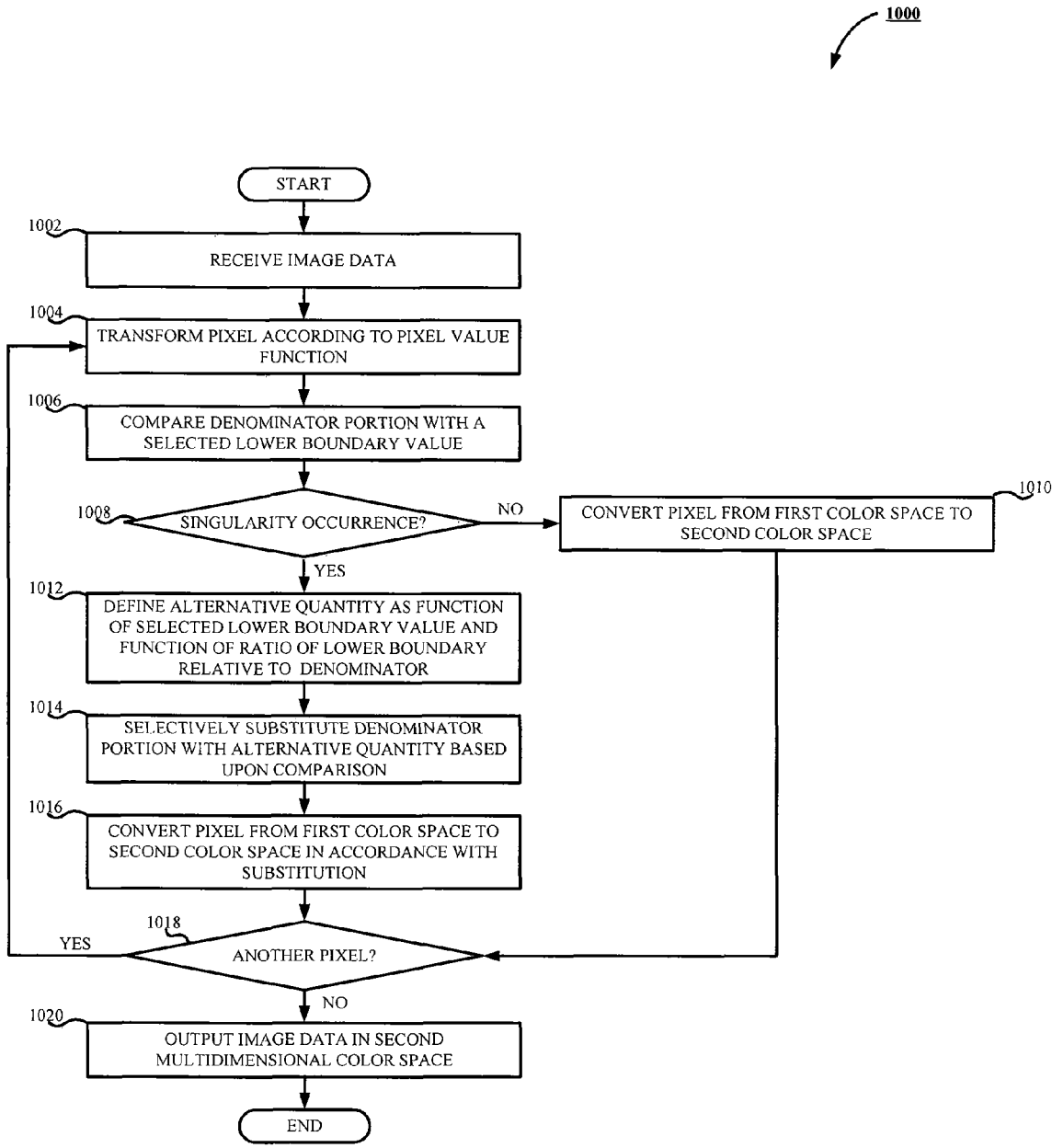
FIG. 10 is a flowchart illustrating a method for color space conversion according to one embodiment of the subject application.

Referring now to FIG. 10, there is shown a flowchart 1000 illustrating a method employing color space conversion in accordance with one embodiment of the subject application. The methodology of FIG. 10 begins at step 1002, whereupon image data is received by the controller 108 or other suitable component associated with the document processing device 104, by the computer workstation 122, or other suitable processing device as will be understood by those skilled in the art. Preferably, the image data comprises a plurality of pixels encoded in a first multidimensional color space. The skilled artisan will appreciate that suitable multidimensional color spaces include, for example and without limitation, CIE u'v', L*u*v*, L*a*b*, XYZ, and the like. It will also be understood by those skilled in the art that such color spaces are derived from corresponding formulae, which incorporate a valid range of quantities. The document processing device 104, the workstation 122, or other such processing devices, as will be appreciated by those skilled in the art, are capable of operations on image data encoded in such color spaces having quantities outside the normal range of the associated formulas. The skilled artisan will further appreciate that while reference is made hereinafter with respect to FIG. 10 as corresponding to soft-clipping (application of the decaying exponential methodology of the subject application), certain circumstances are capable of existing wherein hard-clipping (replacement of all values below a clipping value with the clipping value) is used in addition to, or in place of the soft-clipping of the subject application.

Thus, at step 1004, the controller 104 or other suitable component associated with the document processing device 104, the workstation 122, or the like, initiates conversion of the received image data from the first multidimensional color space to a second multidimensional color space by transforming a pixel according to a pixel value function. In accordance with one embodiment of the subject application, the function of the pixel value in the first multidimensional color space having component values defining a fractional relationship having a numerator portion and a denominator portion, each of which portions include at least one of the component values. At step 1006, the denominator portion of the fractional relationship associated with the pixel is compared to a selected lower boundary value. According to one example embodiment of the subject application, the selected lower boundary value is 0.01, or some other lower value approaching zero, as will be appreciated by those skilled in the art.

In accordance with one embodiment of the subject application, a formula containing a denominator may be modified as follows, in which we symbolize the denominator by S: If it is anticipated that S might sometimes have a zero or negative value during the operation of the system, a suitable lower bound ($S_0$) is selected such that $S_0 > 0$. Then, in the formula, the original denominator S is replaced by the new quantity $S_+$ given by:

$$S_+ = S, \text{ for } S > S_0$$

$$S_+ = S_0 \exp(S/S_0 - 1), \text{ for } S \leq S_0$$

The skilled artisan will appreciate that this replacement is invertible everywhere:

$$S = S_+, \text{ for } S_+ > S_0$$

$$S = S_0[1 + \ln(S_+/S_0)], \text{ for } S_+ \leq S_0$$

In the CIE formulas, this substitution is capable of occurring in several places. For example, in the conversion from CIE 1931 XYZ to CIE 1976 u'v', the formulae are:

$$u' = \frac{4X}{X + 15Y + 3Z}$$

$$v' = \frac{9Y}{X + 15Y + 3Z}$$

Letting D symbolize the denominator here, D is replaced by $D_+$ according to the formula for $S_+$ above. Thereafter, u' and v' are redefined as:

$$u' = \frac{4X}{D_+}$$

$$v' = \frac{9Y}{D_+}$$

The inverse formulae, converting u'v'Y to XYZ, are therefore:

$$D = \frac{9Y}{v'}$$

$$X = \frac{u'}{4}D$$

$$Z = \frac{1}{3}(D - X - 15Y)$$

It will be appreciated by those skilled in the art that the foregoing prompts the replacement of the denominator v' by $v'_+$ in a similar fashion. However, there is then an inconsistency between the replacements, since in one case, $v'D_+=9Y$ and $u'D_+=4X$, and, in the other case, $v'_+D=9Y$ and $u'D=4X$. The solution is to introduce a third substitution by replacing Y by $Y_+$, defined similarly. The following condition is then imposed:

$$v'_+ D_+ = 9Y_+$$

The conversion then proceeds in accordance with the following steps. First calculate:

$$D = X + 15Y + 3Z$$

Then replace D by $D_+$ and Y by $Y_+$ and calculate:

$$v'_+ = \frac{9Y_+}{D_+}$$

$$u' = \frac{4X}{D_+}$$

Finally, replace $v'_+$ by v' by using the inverse formula above for S.

In the reverse direction (u'v'Y→XYZ) the procedure is as follows. First replace Y by $Y_+$ and v' by $v'_+$, using the technique above. Then calculate:

$$D_+ = \frac{9Y_+}{v'_+}$$

$$X = \frac{u'D_+}{4}$$

Finally, replace $D_+$ by D, using the inverse formula, and calculate:

$$Z = \frac{1}{3}(D - X - 15Y)$$

A similar approach is capable of being used in the conversion from u'v'Y to L*u*v*. In this case, there is no singularity in the forward direction, but L* appears in the denominator of the inverse formulas. Thus, the skilled artisan will appreciate that replacing L* by $L^*_+$ removes the singularity, enabling conversion from the u'v'Y color space to the L*u*v* color space.

Returning to FIG. 10, a determination is then made at step 1008 of the comparison performed at step 1006 whether a singularity has been encountered. That is, whether or not the denominator of a fraction is less than or equal to the preselected lower boundary value, e.g. 0.1, 0.01, or the like. The skilled artisan will appreciate that zero and negative values lie outside the physical region represented by the respective color spaces, although they may be very close to that physical region. Upon a determination at step 1008 that no singularity has been encountered, flow proceeds to step 1010, whereupon the pixel is converted from the first multidimensional color space to the second multidimensional color space. A determination is then made at step 1018 whether another pixel remains in the image data for conversion from the first color space to the second color space.

Following a positive determination at step 1018, flow returns to step 1004, whereupon the next pixel in the image data is transformed from the first color space to the second color space in accordance with the pixel value function, so as to define the fractional relationship having a numerator and denominator portion associated with the pixel. At step 1006, the denominator portion of the fractional relationship is compared to the selected lower boundary value so as to determine at step 1008 whether a singularity has been encountered.

Upon a determination at step 1008 that a singularity has been encountered, flow proceeds to step 1012, whereupon an alternative quantity as a function of the selected lower boundary value and as a function of the ratio of the lower boundary relative to the denominator is defined by the controller 108 or other suitable component associated with the document processing device 104, the workstation 122, or the like. At step 1014, the controller 108, the workstation 122, or other suitable device processing the image data conversions of FIG. 10 selectively substitutes the denominator portion with the alternative quantity based upon the comparison of step 1006. At step 1016, the pixel is converted from the first color space to the second color space using the substituted denominator. A determination is then made at step 1018 whether any additional pixels remain in the image data for conversion. When it is determined that no additional pixels remain, flow proceeds to step 1020, whereupon image data encoded in the second multidimensional color space is output by the processing device, e.g. the document processing device 104, the workstation 122, or the like.

Figure 11:
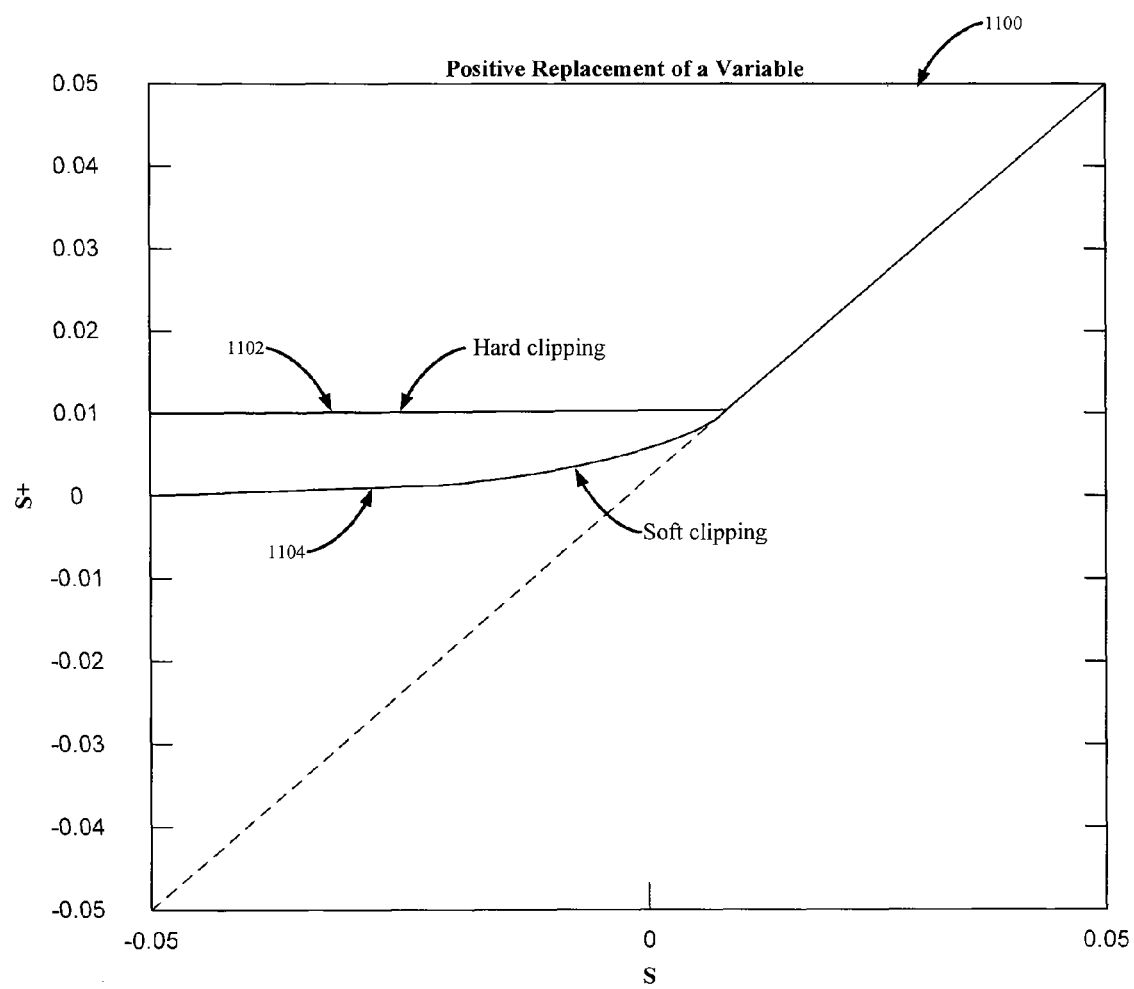
FIG. 11 is a graph illustrating an output from the method for color space conversion according to one embodiment of the subject application.

FIG. 11 illustrates a plot 1100 depicting the denominator replacement using a positive quantity. As will be understood by those skilled in the art, the hard clipping 1102 corresponds to one particular replacement technique, wherein the variable is unmodified above the specified positive lower bound and is replaced by that lower bound itself for lower values, including zero and negative values. Illustrated in FIG. 11, the lower bound is selected at 0.01. In contrast, application of the subject methodology is illustrated by the soft clipping 1104, wherein the exponential variable replacement technique detailed above is implemented. The skilled artisan will appreciate that such a technique employs the exponential function set forth above that diminishes gradually toward zero, without ever reaching zero, as the original denominator is reduced to zero and is allowed to range through all possible negative values.

As will be appreciated by those skilled in the art, the subject application facilitates the replacement of the denominator in the clipping region by a decaying exponential, which is smooth and invertible. The skilled artisan will appreciate that other embodiments of the subject application are capable of implementation in addition to or in place of the decaying exponential, provided certain conditions are met. For instance, any suitable alternate embodiment would decrease steadily toward zero as the argument drops below the specified clipping value, becomes negative, and continues to become more and more negative. Such alternate embodiment would also have to have a continuous slope (first derivative) at the clipping point. The skilled artisan will therefore appreciate that the use of a decaying exponential in the embodiment described herein is for example purposes only, and other embodiments meeting the aforementioned conditions are also capable of being used.

According to one example embodiment, the subject application is applicable to many situations where division is part of a computation. That is, if the division typically occurs in expressions where the denominator is bounded away from zero, but a need arises to employ these expressions outside of the bounds, some special action may be required. The skilled artisan will appreciate that the common hard-clipping approach is satisfactory, but if smoothness and/or invertibility are also required, soft clipping may be a useful technique.

The skilled artisan will appreciate that the system and method of the subject application is suitably adapted for implementation when the denominator is near zero (positive or negative). However, if the denominator becomes too large in the negative direction, the problem may reappear. This is because the finite precision of the digital system places a limit on the smallest number that can be accommodated without triggering an "underflow" condition. The decaying exponential can produce very small replacement values for the denominator, which is capable of resulting in an "underflow" fault. Depending on the system, the division may still proceed, which would produce an overflow condition or even divide-by-zero fault. At this point, it may become necessary to use hard clipping. However, there is still a substantial advantage to the soft-clipping approach, because the hard clipping will not be needed unless the denominator takes on values that are quire far from zero. For instance, if soft clipping is employed for S<0.01, hard clipping won't be needed unless S<−0.35. (That's for typical 64-bit double-precision floating-point processing). The smooth, invertible domain of the function has been extended well below zero, the original boundary point of the valid domain.

The foregoing description of a preferred embodiment of the subject application has been presented for purposes of illustration and description. It is not intended to be exhaustive or to limit the subject application to the precise form disclosed. Obvious modifications or variations are possible in light of the above teachings. The embodiment was chosen and described to provide the best illustration of the principles of the subject application and its practical application to thereby enable one of ordinary skill in the art to use the subject application in various embodiments and with various modifications as are suited to the particular use contemplated. All such modifications and variations are within the scope of the subject application as determined by the appended claims when interpreted in accordance with the breadth to which they are fairly, legally and equitably entitled.

What is claimed:

1. A color space conversion system, including a processor which is configured to execute instructions which cause the processor to operate the system, the system comprising:
    an input operable to receive image data comprised of a plurality of pixels having a value encoded in a first multidimensional color space;
    a color space convertor operable to transform each of the plurality of pixels encoded in the first multidimensional color space to a corresponding pixel encoded in a second multidimensional color space, the color space convertor further being operable to transform each of the plurality of pixels in accordance with a function of the pixel values in the first multidimensional color space having component values thereof defining a fractional relationship having a numerator portion and a denominator portion, each of which portions include at least one of the component values;
    a comparator operable to compare a value of each denominator portion relative to a threshold value; and
    the color space convertor further being operable to transform each of the plurality of pixels encoded in the first multidimensional color space to the second multidimensional color space with selective substitution of each denominator portion with an alternative quantity in accordance with an output of the comparator.

2. The system of claim 1 wherein the alternative quantity is defined in accordance with each of the denominator portions and a selected lower boundary value.

3. The system of claim 2 wherein the alternative quantity is further defined as a function of the selected lower boundary value and a function of a ratio of the lower boundary value relative to each denominator portion.

4. The system of claim 3 wherein the color space convertor transforms each of the plurality of pixels to the second multidimensional color space in accordance with the formula:

$$S_+ = S, \text{ for } S > S_0$$

$$S_+ = S_0 \exp(S/S_0 - 1), \text{ for } S \leq S_0$$

wherein
    S is the denominator portion,
    $S_0$ is the lower boundary value, and
    $S_+$ is the alternative denominator portion.

5. The system of claim 1 wherein the color space convertor is operable to convert between color spaces from the set inclusive of XYZ, u'v', L*a*b* and L*u*v*.

6. A method of color space conversion comprising the steps of:
    receiving image data comprised of a plurality of pixels having a value encoded in a first multidimensional color space;
    converting each of the plurality of pixels encoded in the first multidimensional color space to a corresponding pixel encoded in a second multidimensional color space, the color space converting further comprising transforming each of the plurality of pixels in accordance with a function of the pixel values in the first multidimensional color space having component values thereof defining a fractional relationship having a numerator portion and a denominator portion, each of which portions include at least one of the component values;

comparing a value of each denominator portion relative to a threshold value; and wherein the step of converting further includes converting the plurality of pixels encoded in the first multidimensional color space to the second multidimensional color space with selective substitution of each denominator portion with an alternative quantity in accordance with the comparison.

7. The method of claim 6 wherein the step of comparing further includes comparing each of the denominator portions and a selected lower boundary value.

8. The method of claim 7 wherein the alternative quantity is further defined as a function of the selected lower boundary value and a function of a ratio of the lower boundary value relative to each denominator portion.

9. The method of claim 8 wherein the step of converting further includes converting the plurality of pixels to the second multidimensional color space in accordance with the formula:

$$S_+ = S, \text{ for } S > S_0$$

$$S_+ = S_0 \exp(S/S_0 - 1), \text{ for } S \leq S_0$$

wherein
   S is the denominator portion,
   $S_0$ is the lower boundary value, and
   $S_+$ is the alternative denominator portion.

10. The method of claim 9 wherein the step of converting converts between color spaces from the set inclusive of XYZ, u'v', L*a*b* and L*u*v*.

11. A system of color space conversion system comprising:

means for receiving image data comprised of a plurality of pixels having a value encoded in a first multidimensional color space;

means for converting each of the plurality of pixels encoded in the first multidimensional color space to a corresponding pixel encoded in a second multidimensional color space, the means for converting further comprising means for transforming each of the plurality of pixels in accordance with a function of the pixel values in the first multidimensional color space having component values thereof defining a fractional relationship having a numerator portion and a denominator portion, each of which portions include at least one of the component values;

means for comparing a value of each denominator portion relative to a threshold value; and wherein the means for converting further include means for converting the plurality of pixels encoded in the first multidimensional color space to the second multidimensional color space with selective substitution of each denominator portion with an alternative quantity in accordance with the comparison.

12. The system of claim 11 wherein the means for comparing further includes means for comparing each of the denominator portions and a selected lower boundary value.

13. The system of claim 12 wherein the alternative quantity is further defined as a function of the selected lower boundary value and a function of a ratio of the lower boundary value relative to each denominator portion.

14. The system of claim 13 wherein the means for converting further include means for converting the plurality of pixels to the second multidimensional color space in accordance with the formula:

$$S_+ = S, \text{ for } S > S_0$$

$$S_+ = S_0 \exp(S/S_0 - 1), \text{ for } S \leq S_0$$

wherein
   S is the denominator portion,
   $S_0$ is the lower boundary value, and
   $S_+$ is the alternative denominator portion.

15. The system of claim 14 wherein the means for converting converts between color spaces from the set inclusive of XYZ, u'v', L*a*b* and L*u*v*.

* * * * *